Patented Aug. 28, 1945

2,383,495

UNITED STATES PATENT OFFICE 2,383,495

PREPARATION OF LUBRICANTS

John M. Musselman, South Euclid, Ohio, assignor to The Standard Oil Company, Cleveland, Ohio, a corporation of Ohio No Drawing. Application March 31, 1941,
Serial No. 386,127

22 Claims. (Cl. 252—32.7)

Degras has been known for some time as an addition to mineral oils for lubrication purposes, but such combination has no value in internal combustion engines. I have now found however that by reacting upon degras or other wax as set forth more in detail hereinafter, products may be had which are of particular utility in several respects for lubricating usages even under very drastic high temperature conditions.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The invention will be readily understood by reference to an illustrative instance of its practice:

Degras is heated with a sulphide of phosphorus, for instance $P_2S_5$ until a spontaneous exothermic reaction occurs at about 300° F., and ceases. Generally, a reaction time of an hour or slightly more or less is involved. If molecular amounts, as 1 mol of the degras and ½ mol of the phosphorus pentasulphide be employed, useless dilution with unreacted ingredient material may be avoided, although such is not harmful. A slight excess of the theoretical amount of the phosphorus pentasulphide has some advantage in establishing reaction driving conditions and forcing the reaction of the degras to completion. After the reaction, insoluble matter of sludge-like character can be separated, as by centrifuging or filtering, and the reaction product appears as clear material. This reaction product is next converted into a metal compound thereof by heating with about 10 per cent of zinc oxide at around 250° F. for an hour, and finally any unreacted zinc oxide or solid material is separated by centrifuging or filtering. For lubricant usage, such for instance as added to an S. A. E. 20 lubricating oil, the ordinary tendency to break-down is inhibited, and the lubricant preserves outstandingly clean metal surfaces. In addition, the cold test of the oil is lowered. The amount of the metal compound of the reaction product added to the oil for internal combustion engine usage may be for instance 0.5 to 3 per cent ordinarily. This may be raised if desired for Diesel engine usage and prevention of ring sticking. In general, 0.1 to 10 per cent may be employed for internal combustion engines. For E. P. oils as for lubricating hypoid type gears, 5 to 25 per cent of the product is satisfactory, and for grease usages it may be employed in amount of 5 to 100 per cent, as desired in view of the particular type of service.

As another example: Similar amounts of beeswax and phosphorus pentasulphide are reacted as above, and then the product is further reacted with zinc oxide to form the zinc compound.

As another example: Similar amounts of degras and phosphorus pentasulphide are reacted as above, and then the product is further converted to the tin compound by reacting with caustic soda, and then precipitating with stannous sulphate.

As another example: A similar reaction product of degras and phosphorus sulphide is further reacted to conversion to the aluminum compound.

Likewise, other waxes, such as lanolin, carnauba, Japan wax, sperm oil, etc., may be employed as raw material. The normally non-liquid waxes are particularly advantageous. Other reactive phosphorus sulphides may be employed, as the sesquisulphide, etc. And, other metals applicable are aluminum, calcium beryllium, sodium, potassium, magnesium, tin, etc. That is, any reactive metal. The metal may be introduced by reacting its oxide or hydroxide, or in some cases it is desirable to first make a sodium or potassium compound of the reaction product, as by treating with the hydroxide, and then by double decomposition reaction precipitate this with a soluble salt, such as sulphate, chloride, etc., of the metal desired in the final product. In the saponifying or making the metal compound of the reaction product, I prefer to only partially saponify, such for example as about half, leaving thus more or less of the unsaponified reaction product in the mixture. An advantageous feature which is found to result from this procedure is that the product has excellent resistance against break-down, and maintains particularly clean surfaces on the metal which it lubricates, while if it be in exposure to water there is but very slight tendency to emulsify.

An S. A. E. 20 lubricating oil containing 1 per cent of the zinc salt of phosphorus sulphide reacted degras as above, tested in a test engine of Ethyl Gasoline Corporation type for 20 hours straight running at jacket temperature 212° F. and sump temperature 300° F., showed the following results: viscosity increase 99, acid number 1.1, sludge 0.5 per cent, lacquer on piston 4 mg., piston skirt rating 2.5, motor condition very clean. In contrast, the S. A. E. 20 oil without the addition agent in a similar run showed viscosity increase 413, acid number 2, sludge 4.0 per cent, lacquer 80.0 mg., piston skirt rating 7.0, motor condition medium sludge formation.

The S. A. E. 20 oil with 1 per cent of the zinc salt of the phosphorus sulphide degras reaction product, tested by the A. S. T. M. cold test, was fluid at minus 15° F., whereas the oil without the addition product was solid at 20° F. Similarly, the aluminum and tin salts of such reaction product showed a cold test of minus 20° F.

This application is a continuation, in part, and as to common subject matter of my application Serial No. 376,675, filed January 30, 1941, now Patent No. 2,331,923, patented October 19, 1943.

Other modes of applying the principle of the invention may be employed, change being made as regards the details described, provided the features stated in any of the following claims, or the equivalent of such, be employed.

I therefore particularly point out and distinctly claim as my invention:

1. The process for making a lubricant, comprising reacting a sulfide of phosphorus with an ester wax, and partially saponifying the reaction product by reacting said reaction product with an amount of a metal compound insufficient to complete the reaction that occurs between said reaction product and said metal compound whereby to produce a mixture of said reaction product and the metal compound thereof.

2. The process for making a lubricant, comprising reacting phosphorus pentasulfide with an ester wax, and partially saponifying said reaction product by reacting said reaction product with an amount of a metal compound insufficient to complete the reaction that occurs between said reaction product and said metal compound whereby to obtain a mixture of said reaction product and the metal compound thereof.

3. The process for making a lubricant, comprising reacting a sulfide of phosphorus with degras, and partially saponifying the reaction product by reacting said reaction product with an amount of a metal compound insufficient to complete the reaction that occurs between said reaction product and said metal compound whereby to produce a mixture of said reaction product and the metal compound thereof.

4. The process for making a lubricant, comprising reacting phosphorus pentasulfide with degras, and partially saponifying the reaction product by reacting said reaction product with an amount of a metal compound insufficient to complete the reaction that occurs between said reaction product and said metal compound whereby to produce a mixture of said reaction product and the metal compound thereof.

5. The process for making a lubricant, comprising reacting phosphorus pentasulfide with degras at a temperature of about 300° F., and partially saponifying the reaction product by reacting said reaction product with an amount of a metal compound insufficient to complete the reaction that occurs between said reaction product and said metal compound whereby to produce a mixture of said reaction product and the metal compound thereof.

6. The process for making a lubricant, comprising reacting a sulfide of phosphorus with degras, and partially saponifying the reaction product by reacting said reaction product with an amount of a calcium compound insufficient to complete the reaction that occurs between said reaction product and said calcium compound whereby to produce a mixture of said reaction product and the calcium compound thereof.

7. The process for making a lubricant, comprising reacting a sulfide of phosphorus with degras, and partially saponifying the reaction product by reacting said reaction product with an amount of a zinc compound insufficient to complete the reaction that occurs between said reaction product and said zinc compound whereby to produce a mixture of said reaction product and the zinc compound thereof.

8. The process for making a lubricant, comprising reacting a sulfide of phosphorus with degras, and partially saponifying the reaction product by reacting said reaction product with an amount of an aluminum compound insufficient to complete the reaction that occurs between said reaction product and said aluminum compound whereby to produce a mixture of said reaction product and the aluminum compound thereof.

9. A lubricant comprising an aluminum compound of the reaction product of a sulfide of phosphorus and an ester wax.

10. A lubricant comprising an aluminum compound of the reaction product of phosphorus pentasulfide and degras.

11. A lubricant comprising an aluminum compound of the reaction product of phosphorus pentasulfide and degras reacted at a temperature of about 300° F.

12. A lubricant comprising a lubricating oil and an aluminum compound of the reaction product of sulfide of phosphorus and an ester wax.

13. A lubricant comprising a lubricating oil and and aluminum compound of the reaction product of phosphorus pentasulfide and degras 14. A lubricant comprising the reaction product of an ester wax with a sulfide of phosphorus in admixture with a metal compound of said reaction product, each of said ingredients comprised in the lubricant being present in at least an appreciable amount.

15. A lubricant comprising the reaction product of an ester wax with phosphorus pentasulfide in admixture with a metal compound of said reaction product, each of said ingredients comprised in the lubricant being present in at least an appreciable amount.

16. A lubricant comprising the reaction product of a sulfide of phosphorus and degras in admixture with a metal compound of said reaction product, each of said ingredients comprised in the lubricant being present in at least an appreciable amount.

17. A lubricant comprising the reaction product of phosphorus pentasulfide and degras reacted at a temperature of about 300° F., in admixture with a metal compound of said reaction product, each of said ingredients comprised in the lubricant being present in at least an appreciable amount.

18. A lubricant comprising the reaction product of a sulfide of phosphorus and degras in admixture with a calcium compound of said reaction product, each of said ingredients comprised in the lubricant being present in at least an appreciable amount.

19. A lubricant comprising the reaction product of a sulfide of phosphorus and degras in admixture with a zinc compound of said reaction product, each of said ingredients comprised in the lubricant being present in at least an appreciable amount.

20. A lubricant comprising the reaction product of a sulfide of phosphorus and degras in admixture with an aluminum compound of said reaction product, each of said ingredients comprised in the lubricant being present in at least an appreciable amount.

21. A lubricant comprising a lubricating oil having an addition agent comprising the reaction product of an ester wax with a sulfide of phosphorus in admixture with a metal compound of said reaction product, each of said ingredients comprised in said addition agent being present in at least an appreciable amount.

22. A lubricant comprising a lubricating oil having an addition agent comprising the reaction product of degras with a sulfide of phosphorus in admixture with a metal compound of said reaction product, each of said ingredients comprised in said addition agent being present in at least an appreciable amount.

JOHN M. MUSSELMAN.